(12) United States Patent
Stambaugh

(10) Patent No.: US 8,893,554 B2
(45) Date of Patent: Nov. 25, 2014

(54) SYSTEM AND METHOD FOR PASSIVELY COMPENSATING PRESSURE SENSORS

(71) Applicant: Hamilton Sundstrand Corporation, Windsor Locks, CT (US)

(72) Inventor: Craig T. Stambaugh, Tolland, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 122 days.

(21) Appl. No.: 13/682,507

(22) Filed: Nov. 20, 2012

(65) Prior Publication Data

US 2014/0137651 A1    May 22, 2014

(51) Int. Cl.
*G01L 19/04* (2006.01)
*G01L 9/06* (2006.01)

(52) U.S. Cl.
CPC ............................ *G01L 9/065* (2013.01)
USPC ............................................. 73/708; 73/753

(58) Field of Classification Search
None
See application file for complete search history.

(56) References Cited

U.S. PATENT DOCUMENTS

| | | | |
|---|---|---|---|
| 3,278,834 A | 10/1966 | Perino | |
| 4,478,527 A * | 10/1984 | Mergner | 374/172 |
| 4,798,092 A * | 1/1989 | Lagergren et al. | 73/861.77 |
| 4,798,093 A * | 1/1989 | Kenoun | 73/708 |
| 5,050,423 A * | 9/1991 | Czarnocki | 73/1.62 |
| 6,323,662 B2 * | 11/2001 | Ferri | 324/725 |
| 6,417,678 B2 * | 7/2002 | Furukawa | 324/721 |
| 6,718,830 B1 | 4/2004 | Johnson | |
| 7,347,098 B2 * | 3/2008 | Kurtz et al. | 73/714 |

* cited by examiner

*Primary Examiner* — Lisa Caputo
*Assistant Examiner* — Jermaine Jenkins
(74) *Attorney, Agent, or Firm* — Kinney & Lange, P.A.

(57) ABSTRACT

A temperature-compensated pressure sensor system includes a pressure sensing element, a temperature sensing device, and a temperature compensation network. The pressure sensing element provides a first voltage output representative of a sensed pressure value. The temperature sensing device provides a second voltage output representative of a sensed temperature value. The temperature compensation network is connected to receive the first voltage output provided by the pressure sensing element and the second voltage output provided by the temperature sensing device. The temperature compensation network provides a temperature compensated voltage representative of sensed pressure, wherein the second voltage output passively biases the temperature compensation network.

7 Claims, 1 Drawing Sheet

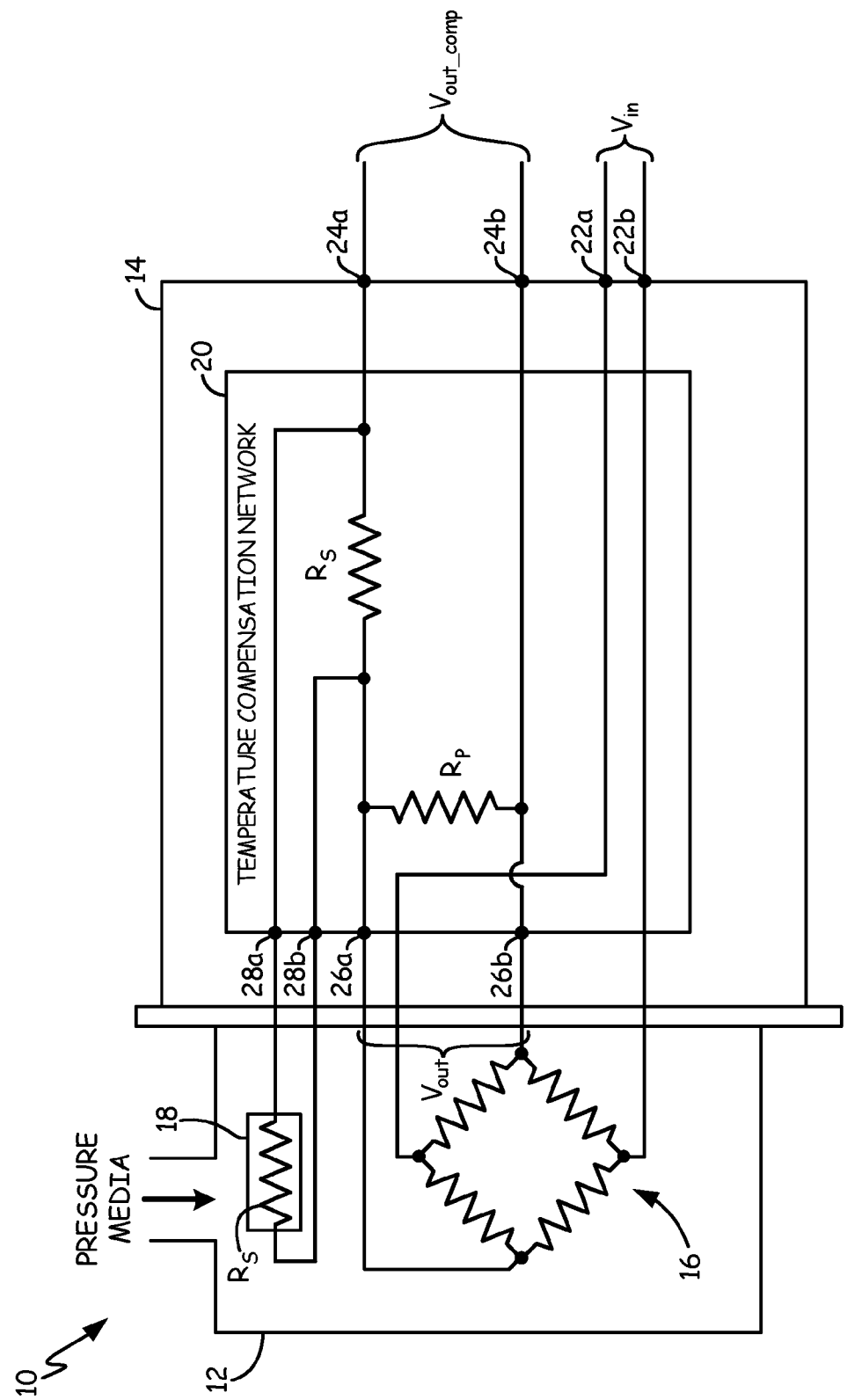

SYSTEM AND METHOD FOR PASSIVELY COMPENSATING PRESSURE SENSORS

STATEMENT OF GOVERNMENT INTEREST

This invention was made with government support under N00019-02-C-3003 awarded by the Department of Defense. The government has certain rights in the invention.

BACKGROUND

The present invention is related to compensation networks, and in particular to compensation networks utilized in conjunction with pressure sensors.

Pressure sensors are used in a variety of applications. A commonly employed type of pressure sensor is the piezoresistive pressure sensor. These types of sensors typically include a silicon diaphragm incorporating an ion implanted piezo-resistive Wheatstone bridge. An applied pressure deflects the diaphragm and imbalances the bridge, producing differential output signal that is proportional to the change in resistance caused by the pressure. Piezo-resistive pressure sensors may be fabricated using either bulk silicon or silicon-on-insulator (SOI) wafers.

Changes in temperature cause changes in the resistance of the legs of the Wheatstone bridge, and can therefore lead to errors in the measured pressure. To accommodate changes in temperature, pressure sensors typically incorporate a resistive compensation network. The resistive compensation network operates by altering the electrical output signal at various temperatures by utilizing a resistor network. The resistor network changes its effective resistance value as a function of temperature to offset the change in output voltage of the Wheatstone bridge due to its temperature sensitivity. However, the resistive compensation network is ineffective if a temperature gradient exists between the Wheatstone bridge and the compensation network. For example, if the Wheatstone bridge is located in close proximity to a pressure medium with a temperature that differs from that of the ambient atmosphere surrounding the resistive compensation network hardware, the difference in temperature can lead to errors in the compensation provided.

In some situations in which accuracy must be maintained in the presence of a temperature gradient, a separate temperature sensing device (e.g., resistive temperature device) is located proximate to the pressure sensing element, and the output of the temperature sensing device is used by a digital device such as an on-board microprocessor or a separate electronic component with software to digitally compensate for temperature variation. However, this requires detailed characterization of the thermally-induced errors on the pressure sensor output during calibration of the pressure sensor, as well as separate wires out of the sensor assembly to conduct this signal to the electronic component, thus increasing cost and weight and reducing reliability.

SUMMARY

A temperature-compensated pressure sensor system includes a pressure sensing element, a temperature sensing device, and a resistive temperature compensation network. The pressure sensing element provides a first voltage output representative of a sensed pressure value. The temperature sensing device is located proximate to the pressure sensing element and provides a resistance that varies with a sensed temperature. A resistive temperature compensation network compensates the first voltage output provided by the pressure sensing element, wherein the compensation provided by the resistive temperature network is biased by the resistance of the temperature sensing device located proximate the pressure sensor device.

BRIEF DESCRIPTION OF THE DRAWINGS

FIG. 1 is a circuit diagram of a temperature compensated pressure sensor system according to an embodiment of the present invention.

DETAILED DESCRIPTION

The temperature compensated pressure sensor system according to an embodiment of the present invention utilizes a temperature sensing device located proximate/adjacent to a pressure sensor to modify the response of the temperature compensation network. The resistance of the temperature sensing device is used to passively bias the temperature compensation network to account for temperature differences between the pressure sensing device and the compensation network.

FIG. 1 is a circuit diagram of temperature-compensated pressure sensor system 10 according to an embodiment of the present invention. System 10 includes pressure sensor portion 12 and housing portion 14. Pressure sensor portion 12 is exposed to the fluid or medium to be sensed and includes pressure sensor element 16 and temperature sensing device 18. Housing portion 14 houses temperature compensation network 20 and may not be exposed to the fluid or medium sensed by pressure sensor element 16, and may therefore be maintained at an ambient temperature different than pressure sensor element 16. System 10 also includes a pair of input terminals 22a, 22b that provide an excitation voltage Vin to pressure sensing element 16, and a pair of output terminals 24a, 24b that provide a compensated output voltage Vout_comp that represents the temperature-compensated pressure sensed by pressure sensing element 16.

In the embodiment shown in FIG. 1, pressure sensing element 16 is a Wheatstone bridge comprised of a plurality of resistive elements whose resistances vary with the deflection of these elements. That is, deflection of one or more legs of pressure sensing element 16 causes a difference in resistance between the one or more legs that results in a voltage differential Vout at the output of pressure sensing element 16. The output voltage Vout of pressure sensing element 16 is provided to input terminals 26a, 26b of temperature compensation network 20.

Temperature sensing device 18 is located proximate to pressure sensing element 16 and has a resistance that varies with temperature sensed. Temperature sensing device 18 may be implemented with a resistive temperature device (RTD), thermistor, or other well-known temperature sensing device whose resistance changes with temperature. Temperature sensing device 18 is connected to temperature compensation network 20 via temperature compensation inputs 28a and 28b. As described in more detail below, the varying resistance provided by variations in temperature measured by temperature sensing device 18 modify the resistance and therefore the response of temperature compensation network 20 to account for a temperature gradient that exists between pressure sensor portion 12 and housing portion 14.

In the embodiment shown in FIG. 1, temperature compensation network 20 is a resistive network comprised of resistors Rp and Rs that are selected to compensate the output voltage provided by pressure sensor 16 for changes in temperature, thereby negating the thermally-induced error of the sensor element 16. If pressure sensing element 16 and temperature compensation network 20 are at the same temperature, then temperature compensation network accurately modifies the output provided by pressure sensing element 16. However, if a temperature gradient exists between pressure sensing element 16 and temperature compensation network 20, then temperature compensation network 20 fails to properly compensate the output voltage provided by pressure sensing element 16.

To overcome this limitation, temperature sensing device 18 is connected to temperature compensation network 20 to modify the response of temperature compensation network 20. In the example shown in FIG. 1, temperature sensing device 18 is connected in parallel with resistor Rs. Because the resistance of temperature sensing device 18 varies with the temperature of the fluid media provided to pressure sensor portion 12, the resistance and therefore the compensation provided by temperature compensation network 20 is modified based on the temperature sensed proximate to pressure sensor device 16. In this way, the compensation provided by temperature compensation network 20 is passively modified by temperature sensing device 18 without the need for active compensation provided by a digital device/software connected to the output of temperature compensation network 20. As a result, the compensated output Vout_comp provided by temperature compensation network 20 accurately compensates for differences in temperature between temperature compensation network 20 and pressure sensor element 16 based on the passive feedback provided by temperature sensing device 18.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A temperature-compensated pressure sensor system that comprises:
   a pressure sensing element that provides a first voltage output representative of a sensed pressure value;
   a temperature sensing device located proximate the pressure sensing element that provides a resistance that varies with a sensed temperature; and
   a resistive temperature compensation network, connected to the pressure sensing element and to the temperature sensing device, that compensates the first voltage output provided by the pressure sensing element, wherein the compensation provided by the resistive temperature network is biased by the varying resistance of the temperature sensing device, and wherein the resistive temperature compensation network is located in a housing separate from the pressure sensing element.

2. The temperature-compensated pressure sensor system of claim 1, wherein the pressure sensing element is a solid-state silicon-on-insulator (SOI) pressure sensor.

3. The temperature-compensated pressure sensor system of claim 1, wherein the temperature sensing device is a resistive temperature device (RTD), a thermistor, or other well-known temperature sensitive device whose resistance varies with changes in temperature.

4. The temperature-compensated pressure sensor system of claim 1, wherein the temperature compensation network includes a first resistor in series between the first voltage output of the pressure sensor device and a first voltage output of the temperature compensation network and a second resistor in parallel with the pressure sensing element.

5. The temperature-compensated pressure sensor system of claim 4, wherein the temperature sensing device is connected in parallel with the first resistor.

6. A temperature-compensated network located in a housing separate from a pressure sensor device, the temperature-compensation network comprising:
   input terminals connected to the pressure sensor device for receiving a voltage representative of sensed pressure;
   output terminals connected to provide a voltage representative of a compensated pressure;
   temperature compensation inputs connected to a resistive temperature sensor device located proximate to the pressure sensor device, wherein the resistance of the temperature sensor device varies with temperature; and
   a resistive network connected between the input terminals and the output terminals and modified by the varying resistance provided by the temperature sensor device provided at the temperature compensation inputs, wherein in response to the received voltage representative of sensed pressure the resistive network provides a temperature compensated voltage representative to the output terminals.

7. The temperature-compensated network of claim 6, wherein the resistive network includes a first resistor connected in series between the input terminals and the output terminals, and a second resistor connected in parallel with the pressure sensing element, wherein the resistance provided by the resistive temperature sensor via the temperature compensation inputs is connected in parallel with the first resistor.

* * * * *